(12) United States Patent
Stewart et al.

(10) Patent No.: US 7,476,137 B2
(45) Date of Patent: Jan. 13, 2009

(54) EXPANDABLE WAVE ENERGY CONVERSION SYSTEM

(75) Inventors: David B. Stewart, Cranbury, NJ (US); James S. Gerber, St Paul, MN (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 11/510,459

(22) Filed: Aug. 25, 2006

(65) Prior Publication Data
US 2007/0046027 A1    Mar. 1, 2007

Related U.S. Application Data

(60) Provisional application No. 60/712,071, filed on Aug. 29, 2005.

(51) Int. Cl.
*B63B 22/00* (2006.01)
*F03B 13/10* (2006.01)

(52) U.S. Cl. .................. 441/1; 290/42; 290/53
(58) Field of Classification Search ........... 441/1
See application file for complete search history.

(56) References Cited

U.S. PATENT DOCUMENTS

| 2,546,956 | A | * | 3/1951 | Yeomans ............... 441/29 |
| 3,570,437 | A | * | 3/1971 | Davis, Jr. ............... 114/333 |
| 5,176,552 | A | * | 1/1993 | Kuboyama et al. ........ 441/16 |
| 5,842,838 | A | * | 12/1998 | Berg ..................... 417/331 |
| 6,392,314 | B1 | * | 5/2002 | Dick ..................... 290/53 |
| 7,140,180 | B2 | * | 11/2006 | Gerber et al. ............ 60/496 |
| 7,199,481 | B2 | * | 4/2007 | Hirsch .................. 290/42 |
| 2002/0155767 | A1 | * | 10/2002 | Sung .................... 441/16 |

* cited by examiner

*Primary Examiner*—Jesus D Sotelo
(74) *Attorney, Agent, or Firm*—Henry I. Schanzer

(57) ABSTRACT

A wave energy converter (WEC) for converting energy contained in surface waves on a body of water to useful energy comprises two floats movable relative to one another in response to passing surface waves. Both floats comprise expandable outer envelopes which have been expanded into full and firm shape. In one process, expansion is obtained by filling the floats with fluids, for example, air and water. The fluids can be pumped into the floats, or the floats can be mechanically expanded in the presence of the fluids for self filling owing to pressure differentials. In one embodiment, a float envelope can comprise of plurality of end to end connected length sections in nested or telescoped relationship. Expansion is obtained by pulling the telescoped sections out from one and other, for example, by pumping fluids into the telescoped sections.

12 Claims, 4 Drawing Sheets

EXPANDABLE WAVE ENERGY CONVERSION SYSTEM

This application claims the benefit of provisional application No. 60/712,071 filed Aug. 29, 2005.

BACKGROUND OF THE INVENTION

This invention relates to the conversion of energy present in surface waves on bodies of water to useful energy, and particularly to improvements in the handling and deployment of such systems.

In co-pending patent application Ser. No. 10/762,800, filed Jan. 22, 2004 (the subject matter of which is incorporated herein by reference), there is disclosed, among other things, a wave energy converter (WEC) comprising one or more annular floats disposed along an elongated (spar-like) float. The present invention relates to variations in and improvements over the embodiments disclosed in said application, and to other WECs in general.

SUMMARY OF THE INVENTION

At least one component of a WEC (comprising at least two relatively movable components) is formed from an expandable envelope which, for deployment in a body of water, is expanded into a body of sufficient rigidity for transmitting mechanical forces. The expansion can be performed using fluids, e.g. air and/or water, which completely fill the envelope for fully expanding or inflating it. Alternatively, the fluids are used to fill and expand skeletal structures, such as tube-like ribs, attached to the envelope. When so filled, the expanded structures also expand the envelope. Alternatively again, envelope expansion can be obtained by rearranging portions of an envelope, e.g. pulling open a telescoped series of end to end connected envelope sections. In one embodiment, a canister of high-pressure gas is disposed within a component which is first partially or completely filled with a fluid, e.g. ocean water, from an external source. Then, gas is released from the canister for providing a desired initial internal pressure and/or for replacing fluids lost during use of the WEC.

DESCRIPTION OF THE DRAWINGS

The drawings are schematic and not to scale.

DETAILED DESCRIPTION

Figure 1:
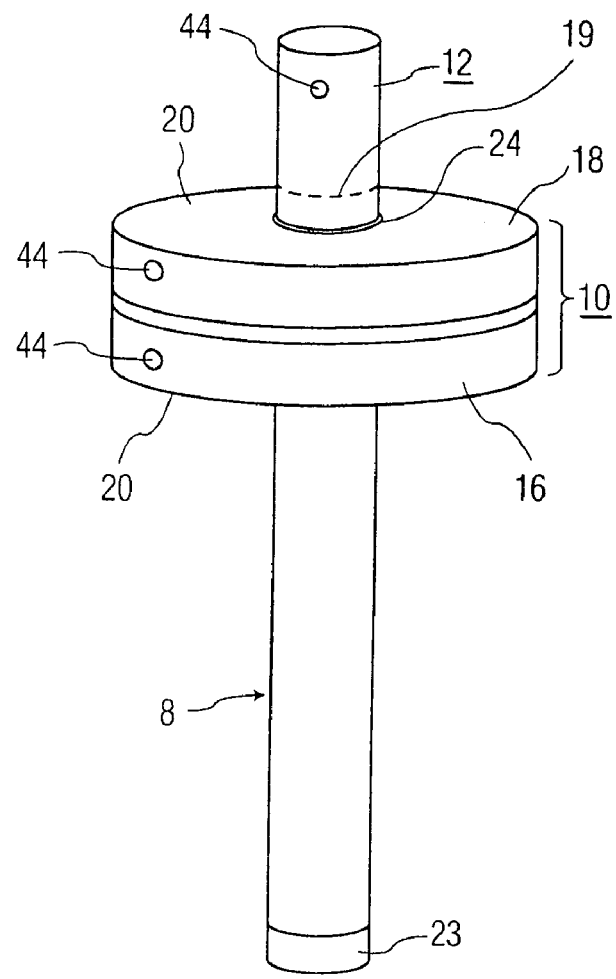
FIG. 1 is a perspective view of an inflated WEC including annular and spar-like floats in accordance with this invention.

An example of a WEC 8 in accordance with this invention is shown in FIG. 1. The WEC comprises first 10 and second 12 floats designed to float within a body of water and to be movable relative to one another in response to passing waves. The first float 10 comprises two separate members 16 and 18, each of annular shape, and each including a circular rim 20 enclosing a central opening 24. The members are secured to one another, as by straps (not shown), and the two members 16 and 18 function together as a single, annular float. The second float 12 is elongated or spar-shaped and comprises either, as shown herein, a single member or (not shown) several parallel members.

When deployed in the water, the orientation of the WEC is as shown in FIG. 1; i.e. the spar 12 floats in vertical orientation and the annular float 10 floats horizontally on the water surface. Thus, and as disclosed in the above-cited co-pending patent application, in response to the passage of trains of surface waves, the two floats 10 and 12 tend to bob up and down in out of phase relationship with one another, e.g. while one float, e.g. the annular float 10, is rising, the spar float 12 may be falling.

Figure 2:
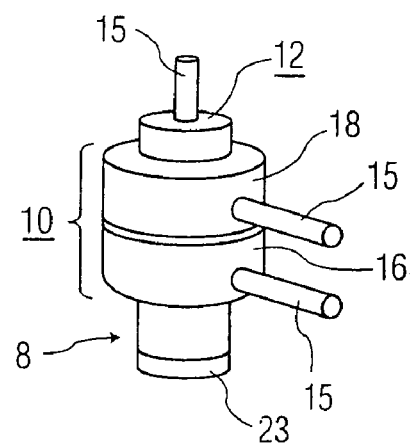
FIG. 2 shows the WEC of FIG. 1 in a deflated condition and showing detachable hoses used for inflating the WEC.

An energy transducer, e.g. a linear electrical generator of known type, is disposed between the two floats 10 and 12 for converting relative movements between the floats into useful energy. While not illustrated herein, elements forming a linear generator are disposed along the length surface of the spar float 12 and on inner surfaces of the annular float 10 facing directly towards the spar float 12. An example of a suitable linear electrical generator is shown in U.S. Pat. No. 6,020,653, Woodbridge et al., Feb. 1, 2000, the subject matter of which is incorporated herein by reference Each of the float members comprising the WEC 8 shown in FIG. 1 is formed from a flexible, non-self-supporting material. That is, the various float members, when not pressurized, collapse upon themselves similarly as a deflated balloon. This greatly simplifies transport and handling of the system. (FIG. 2 shows the WEC 8 when the various members thereof have not yet been inflated. Also shown are hoses 15 for admitting fluids, as hereinafter explain, into the WEC members.)

The flexible envelopes of the different float members of the WEC 8 can be of various commercially available materials used, for example, in inflatable tire tubes or inflatable rafts or the like. A suitable material is PVC coated rubber tubing or a synthetic rubber having the trade name "Hypalon".

In actual use, the floats must be rigid for transmitting mechanical forces, and the different float members are fully inflated when deployed. While various inflating materials can be used, the preferred materials are water and various gases, such as air and commercially available pressurized gases such as carbon dioxide and nitrogen. The lower member 16 (FIG. 1) of the composite annular float 10 is thus preferably completely filled with water while the upper member 18 is completely filled with air. In this illustrative embodiment, the two members are of equal volume. An advantage of forming the float 10 of two separate members 16 and 18 is that each member can be filled independently of the other. This simplifies fine tuning of the weight of the float 10 during its deployment.

In contrast to the dual member float 10, the spar float 12 illustrated herein comprises a single member filled with both air and water, e.g. 80% water by volume, remainder air. (FIG. 1 includes a dash line 19 indicating the interface between the water and air in the spar 12.)

In another embodiment, not illustrated, the spar float comprises separate top and bottom compartments. The top compartment is filled with air, and the bottom compartment is filled with 99% water and 1% air to make the spar rigid.

For maintaining the spar in upright orientation, a weight 23, e.g. of concrete or lead, may be disposed at the spar lower end.

Figure 3:
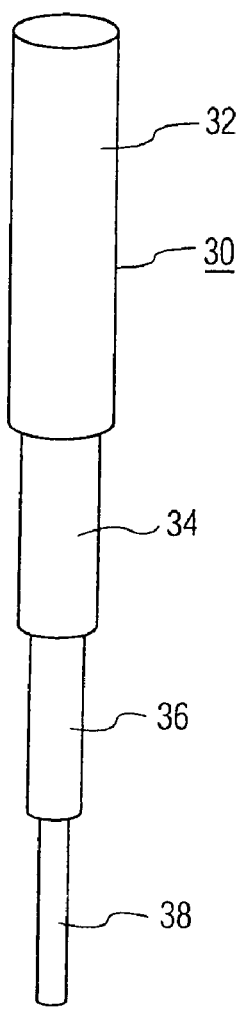
FIG. 3 is a view of a spar float similar to the one shown in FIG. 1, but showing a telescoping version.
Figure 4:
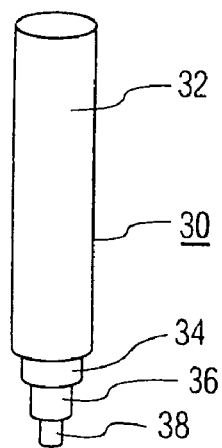
FIG. 4 shows the spar shown in FIG. 3 but in telescoped, collapsed condition.

In the embodiment shown in FIGS. 1 and 2, both floats 10 and 12 are bag-like in the sense that they comprise flexible material envelopes which expand when inflated or filled with an inflating material. In contrast to this, FIG. 3 shows a spar float 30 made from rigid materials, e.g. stainless steel, but being expandable by virtue of cylindrical sections 32, 34, 36 and 38 telescoping one inside the other. FIG. 4 shows the spar float 30 in its collapsed or unexpanded configuration. During deployment, the various nested sections 32, 34, 36 and 38 are pulled out one from the other for length-wise expanding the spar. Known means, not shown, are preferably provided for locking the spar sections in fixed end to end position. Additionally, a weight 23 is disposed at the bottom end of the spar for maintaining it in expanded configuration as well as for maintaining it in vertical orientation. In another embodiment, expansion of nested spar sections is obtained by filling the spar with one or more fluids, preferably under pressure to ensure full expansion of the spar even if under water.

Figure 5:
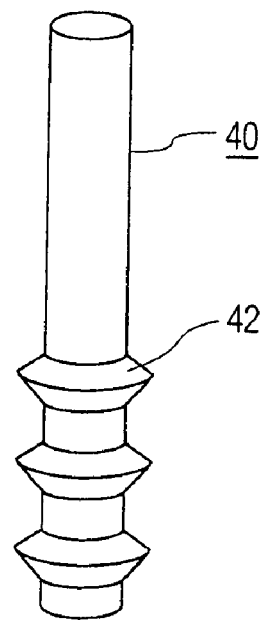
FIG. 5 shows a spar float having accordion-like folds allowing for length-wise expansion and contraction of the spar.

In FIG. 5, a spar 40 is shown with accordion type pleats 42 allowing length-wise expansion of the spar. Such expansion can be in response to a filling or inflating process, or simply by the provision of a relatively large bottom weight 23 for stretching the spar pleats.

Various processes can be used to inflate the floats. Most simply, the floats are filled by pumping water and/or air through float inlet valves 44 (shown schematically in FIG. 1) of the floats. FIG. 2 shows separate hoses 15 coupled to respective float members for pumping the appropriate fluid(s) therein. With relatively small WECs, pumping can be performed while the WECs are on a barge or the like, and the WECs then lifted for deployment in the water.

With a larger systems, it is generally preferred to deploy the WECs in the water while un-inflated and to thereafter inflate them using pumps on a barge, or the like, connected by hose to the floats. FIG. 2 shows a WEC 8 as it is being inflated. The location of the WEC is not indicated; it could be on a barge or the like, or already deployed in a body of water. In either event, expansion of the WEC members occurs as a result of fluids filling the interiors thereof.

In an alternate arrangement, the floats include skeletal structures which can be used to cause mechanical expansion of the floats.

Figure 6:
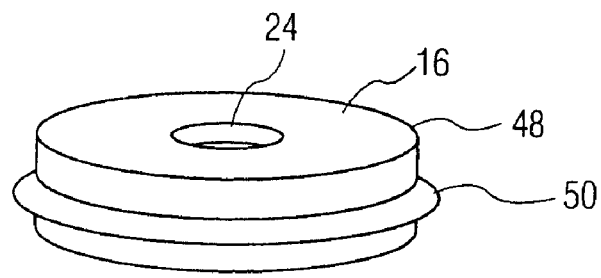
FIG. 6 is a view of an annular float including an external inflatable tube.

FIG. 6, for example, shows an annular float 16 comprising a flexible material envelope 48 including, attached around the periphery of the envelope, an external hollow rib 50 much like a tire inner tube. Pumping a fluid, e.g. air, into the rib 50 causes it to expand to circular shape, thereby expanding the attached float envelope 48. By expanding the envelope while the envelope is submerged in a body of water, water enters the envelope (via an inlet valve) in response to the reduced inner pressure caused by the volume expansion.

Figure 6A:
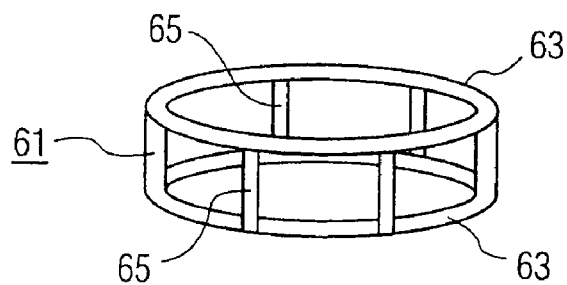
FIG. 6A is a view, in perspective, of a skeletal structure for use in an annular float such as shown in FIG. 1.

FIG. 6A shows another skeletal structure 61 for providing either of the annular floats 16 or 18 shown in FIG. 1. The structure 61 comprises two hollow tubes 63, similar to bicycle inner tubes, spaced apart by hollow spacers 65. The spacers 65 are in communication with the inner spaces of both tubes 63. The entire structure 61 is enclosed within an envelope (not shown) of, for example, Mylar. When in use, the structure 61 is inflated with air through a single valve for inflating the entire structure.

Figure 7:
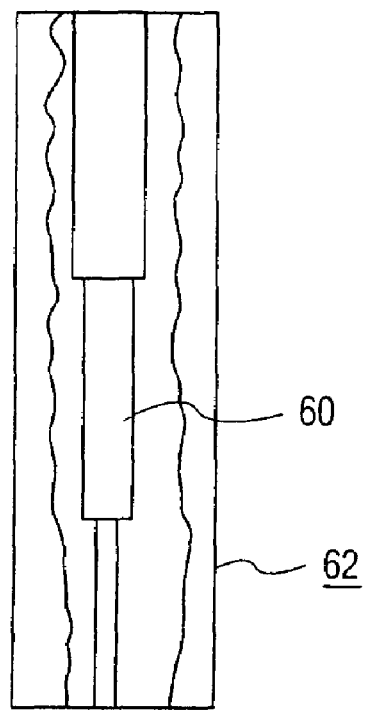
FIG. 7 is a side elevation, partially broken-away, of a spar float having an expandable, internal skeletal structure for causing volume expansion of the float.

FIG. 7 shows a telescoping skeletal structure 60 disposed within a spar float 62. By admitting pressurized air or water into the telescoped structure, lengthwise expansion of both the structure and the float occur. Depending upon where such expansion occurs, i.e. underwater or in air, the ambient water or air enters the enlarged interior space.

Figure 8:
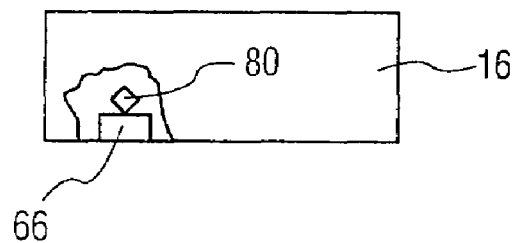
FIG. 8 is a side elevation, partially broken-away, of an annular float including a high-pressure air canister for providing air to the float.

FIG. 8 shows a pressurized air canister 66 within an annular float 16. Preferably, the float is initially almost completely filled with water to provide the desired buoyancy. Air is then pumped into the float to provide the desired internal pressure and stiffness. Thereafter, the canister 66 is used to replace air which may be lost. For example, under severe storm conditions and excessively high external pressures on the annular float, a safety precaution is to release some of the air from the float for reduction of internal pressure. After the storm, air is discharged from the canister to return the air pressure within the float to its normal operating pressure. The air canister can have other uses; e.g. providing initial inflation of the float members 16, or inflation of the rib 50 shown in FIG. 6 for expanding the float 18.

FIG. 8 further shows an antenna 80 mounted on the canister 66 for remote control thereof.

What is claimed is:

1. A wave energy converter (WEC) for converting energy contained in surface waves on a body of water to useful energy, said WEC including a float having an expandable envelope for facilitating its deployment when it is to be disposed in said body of water, and including means for causing expansion of said envelope and retaining said envelope in an expanded fixed volume condition when deployed and disposed in said body of water; and wherein said float further includes a pressure relief valve for venting a fluid from the float under intermittent conditions of excessive water pressure, and including a pressurized fluid canister within said float for replenishing said vented fluid.

2. A WEC according to claim 1, wherein said envelope is flexible to facilitate its deployment, and said expansion means comprises a filler material disposed within said envelope for causing said envelope to maintain a fixed displacement when deployed in said body of water.

3. A WEC according to claim 2, wherein said filler material comprises one or more fluids for maintaining said envelope substantially rigid when deployed and disposed in said body of water.

4. A WEC according to claim 3, wherein said fluids are selected from the group consisting of air, water, nitrogen and carbon dioxide.

5. A WEC according to claim 1, wherein said float comprises a plurality of end to end elongated sections in telescoping relationship for varying the length of said float.

6. A WEC for converting energy contained in surface waves on a body of water to useful energy, said WEC including a float having an expandable envelope for facilitating its deployment when it is to be disposed in said body of water, and including means for causing expansion of said envelope and retaining said envelope in an expanded fixed volume condition when deployed and disposed in said body of water; and wherein said float comprises two separate members, one of which is filled with a gas, and the other of which is filled with water.

7. A WEC according to claim 6 wherein said one member includes a pressurized gas canister for inflating said one member.

8. A WEC according to claim 6 wherein each of said members has an annular shape including a rim encircling a central opening, said two members being secured to one another with the central openings thereof being in alignment, and including a second, elongated float extending through said central openings in sliding relation therewith.

9. A WEC according to claim 8 wherein said second float is filled with water and gas in the ratio of about 4:1, respectively, by volume.

10. A WEC according to claim 6, wherein said float comprises a plurality of end to end elongated sections in telescoping relationship for varying the length of said float.

11. A WEC according to claim 6 wherein said float includes along the length thereof a plurality of accordion type pleats for varying the length of said float.

12. A WEC for converting energy contained in surface waves on a body of water to useful energy, said WEC including a float having an expandable envelope for facilitating its deployment when it is to be disposed in said body of water, and including means for causing expansion of said envelope and retaining said envelope in an expanded fixed volume condition when deployed and disposed in said body of water; and wherein said float includes along the length thereof a plurality of accordion type pleats for varying the length of said float.

* * * * *